Figure 1:
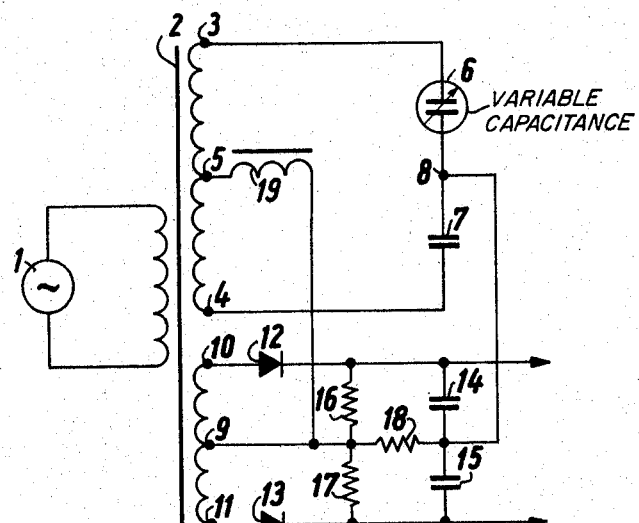

Jan. 17, 1967            H. ROHLWES           3,299,286
CAPACITIVE TRANSFORMER IN BRIDGE CONNECTION FOR PRODUCING
ELECTRICAL CURRENT OUTPUT LINEARLY PROPORTIONAL
TO CAPACITANCE

Filed May 31, 1963                                    2 Sheets-Sheet 1

Inventor:
Harald Rohlwes
By Ernest G Montague
attorney 3,299,286
CAPACITIVE TRANSFORMER IN BRIDGE CONNECTION FOR PRODUCING ELECTRICAL CURRENT OUTPUT LINEARLY PROPORTIONAL TO CAPACITANCE
Harald Rohlwes, Paudex, Switzerland, assignor to Georg Neumann, Berlin-Grunewald, Germany
Filed May 31, 1963, Ser. No. 284,534
Claims priority, application Switzerland, May 31, 1962, 6,616/62, 6,687/62, 6,688/62
7 Claims. (Cl. 307—88.5)

The present invention relates to a capacity transformer in bridge connection.

Capacitive transformers operate basically by the following principle, according to which any effect changes the capacity of the condenser forming the transformer. This capacity change is transformed into a voltage change by a suitable circuit. Such capacity transformers are used in condenser microphones, in capacitive pick-ups, in pressure indicators, in length- and thickness-measuring devices, etc.

In many of these devices, among others, a circuit with direct-current polarization and followed by amplification, by means of electronic tubes, is used. By using this method, however, the noise factor caused by the electronic tube, the high consummation of current, the heating time period and the limited life of the electronic tube, are disturbing. An extensive drawback resides furthermore in the required high insulation resistance of all parts of the input circuit.

In addition, for miniature structures, having small current consumption requirements, tests show that this problem may be solved by means of transistors. For the circuits set forth above normal transistors cannot be used, since the output impedance of the capacitive transformer is much higher than the source impedances, due to the constructively required small capacity, which source impedances bring about in the conventional transistors a good signal-noise effect ratio. Also a downward transformation of the resulting alternating voltage is not possible due to the required very high transformer input impedance.

On the other hand circuits are known for a long time, in which a high frequency alternating voltage is used instead of the direct voltage polarization. By using this principle, transistorized circuits can be realized. They are set up mostly in bridge connections. In one bridge branch is disposed the transformer as a fixed variable capacitance, and in the other bridge branch there is arranged a fixed condenser, which has the same capacity as the transformer. The other bridge branch comprises a suitably tapped inductance, which may be simultaneously, the secondary winding of a high frequency transformer, on the primary side of which the oscillator feeding the bridge is connected. This circuit has the advantage, that the capacity of the transformer as well as the capacity of the fixed condenser, disposed in series, forms an oscillating circuit jointly with the inductance of the secondary winding, the oscillating circuit determining the frequency of the oscillator.

In the described circuit, the neutral branch of the bridge is formed between the center tap of the inductance, on the one hand, and at the connecting point between the transformer and the fixed condenser, on the other hand. If the two bridge branches are in balance, the voltage on the neutral branch of the bridge is zero. If the capacity of the transformer changes, depending on the modulation, the bridge balance changes likewise and a modulated high frequency voltage is created in the neutral branch. The resulting pulsating high frequency voltage is demodulated. Since the modulation can be positive as well as negative, a phase shift of 180° occurs during each neutral passing of the modulation in the high frequency voltage occurring in the neutral branch. If such high frequency voltage is demodulated through a rectifier, a signal is obtained, which has the double frequency of the original modulation. If the bridge, however, is detuned such that a voltage occurs in the neutral branch even without modulation, which voltage is larger than the expected largest modulation amplitude, no phase shift occurs. During the demodulation of this high frequency signal a frequency is obtained at the output side of the demodulator, which frequency corresponds with the modulation frequency.

The value of the voltage occurring on the demodulator can be increased such that a push-pull demodulator is connected on two points disposed symmetrically relative to the center of the bridge inductance, instead of a detuning of the bridge. The voltages taken from the two rectifiers, of the demodulator, are fed to two resistances disposed in series, which are measured such that the current through the two rectifiers is disposed in the linear portion of the characteristic curve. In addition, the output side of each rectifier is connected with the neutral point of the bridge by means of a condenser. Between the connecting point of the two condensers and the center tap of the inductance, an additional inductance is provided, which provides a bleed off of charges occurring at the two bridge capacitors.

The bridge circuit has, however, unfavorable noise characteristics. One reason for these unfavorable noise characteristics is found in the fact that the demodulator is fed from a source impedance which consists of a capacitance, which causes an unfavorable phase-shift, as soon as a resistance load is applied by the demodulator. A further ground for the unfavorable noise characteristic is found in the fact that the parallel resistances disposed at the output, that means also in the modulation intervals, receive a current continuously, so that an additional noise is created and the circuit becomes undesirably highly resistive. Furthermore, the resistances determining the source resistance cannot be chosen at too low a value because too much energy is taken from the oscillator.

It is, therefore, one object of the present invention to provide a capacitive transformer in bridge connection which avoids the drawbacks of the known circuits.

It is another object of the present invention to provide a capacitive transformer in bridge connection, wherein at least one inductance is disposed in series with the capacitance effective in the neutral branch of the bridge and which forms with this capacitance an LC-member, the resonant frequency of which coincides with the frequency of the oscillator.

The novel capacity transformer has the advantage that by insertion of a suitably variable inductance in front of the demodulator, the phase-shift caused by the mostly capacitive impedance of the bridge circuit is avoided. If the LC-member consisting of this inductance and capacitance at the output of the bridge circuit is brought into resonance with the frequency of the oscillator, the source impedance for the demodulator amounts to a very low resistance. This is very desirable and leads to very favorable noise characteristics upon corresponding arrangement of the demodulator and to a low output impedance of the capacitive transformer.

Figure 2:
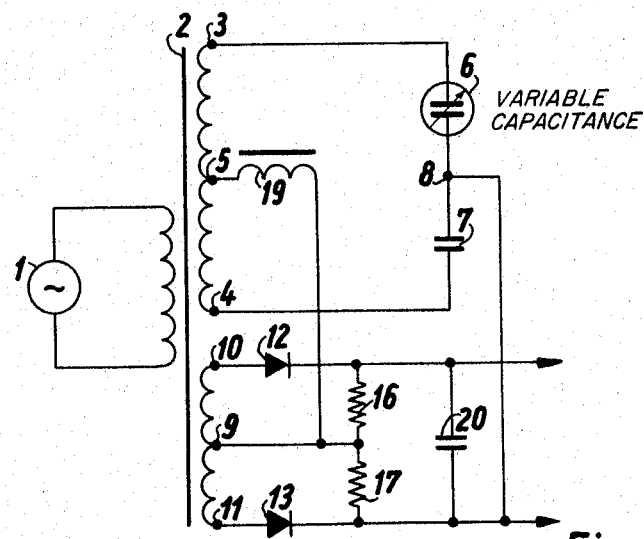
Figure 3:
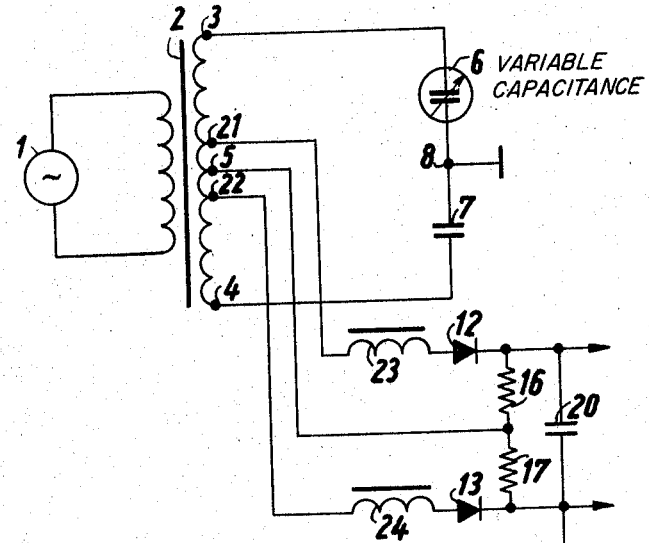
Figure 4:
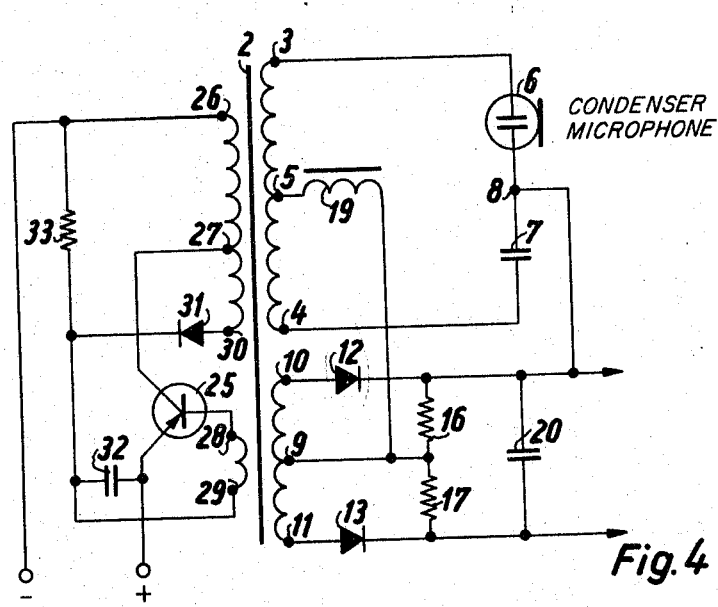

With these objects in view, and other objects which will become apparent in the following detailed description, the present invention will be clearly understood in connection with the accompanying drawings, in which:

FIGURES 1 and 2 disclose circuit diagrams of capacitive transformers, wherein an inductance is disposed in series with the bridge capacitance;

FIG. 3 is a circuit diagram of a capacitive transformer, wherein in each of the conduits to the demodulator there is inserted an inductance; and FIG. 4 is a circuit diagram showing the use of a transistor in conjunction with the bridge circuit.

Referring now to the drawings, and in particular to FIG. 1, the high frequency voltage required for the operation of the circuit is supplied by an oscillator 1, the frequency of which is preferably determined by an oscillating circuit consisting of the members of the bridge circuit. The coupling between the oscillator and the bridge takes place by means of a transformer 2. The bridge circuit with the capacitive transformer, for instance a condenser microphone, comprises a secondary winding of the transformer 2 with the winding terminals 3 and 4 and the center tap 5, as well as the variable capacitance 6 and the equally large fixed condenser 7, the connecting point of which is indicated at 8. Contrary to the known circuit, the neutral branch 5, 8 is used as bridge output, in which neutral branch 5, 8 no voltage is created, if no modulation is present.

A modulated high frequency is created at the bridge output 5, 8 which modulated high frequency rotates its phase by 180° during each zero passing of the modulation. Furthermore, the modulated high frequency voltage, disposed at the bridge output 5, is so small, that it cannot be rectified, because the amplitude of this voltage does not extend into the straight part of the characteristic line of the rectifier. For these reasons the voltage to be rectified is fed to the center tap 9 of the second winding 10, 11 of the transformer 2. In the second winding 10, 11 a high frequency voltage is present which is the same frequency as that of the modulated high frequency voltage. This voltage occurring at both windings is appreciably higher than the applied modulated high frequency voltage. In one-half of the second winding, for instance, 9, 10 and in the other half of the second winding, for instance, 9, 11, a subtraction of the two voltages takes place. In addition to the desired increase of the voltage also the phase shift is thereby compensated. The created modulated high frequency voltage can thus be rectified without any difficulty and without distortion. The voltages created in the second winding 10, 11 are demodulated by means of two rectifiers 12 and 13. Due to the same directional arrangement of the two rectifiers 12 and 13, the condensers 14 and 15 are charged such that the voltages fed from the windings 10 and 11 compensate each other. Merely a voltage difference remains, which corresponds with the modulated high frequency voltage fed from the center tap point 9 from the bridge. The resistances 16, 17 and 18 serve to discharge the condensers 14 and 15.

The circuit functions prefectly without loading the output. Upon connecting a device, the bridge circuit is loaded over the demodulator. Since this circuit has a capacitive characteristic, a phase-shift takes place, due to this load, which phase-shift brings about the following effects: The inner resistance of the circuit rises with the load and the modulation depth of the modulated high frequency voltage fed to the rectifiers 12 and 13 decrease. since due to the phase-shift between the high frequency fed from the bridge and present in the winding 10, 11, no optimum addition and subtraction, respectively, takes place any more. By the addition of an inductance 19, in accordance with the present invention, the following advantages are brought about: The impedance of the bridge assumes a resistive character, so that the modulated high frequency voltage emerging from the bridge becomes independent of the load in relation to its phase-shift. Simultaneously, the source resistance is reduced to a minimum, since the inductance 19 with its capacitance 6, 7, effective at the bridge, is tuned to the frequency of the oscillator 1 as to its resonance. Furthermore, by this arrangement, an optimum addition and subtraction of both high-frequency voltages takes place, since they are joined at equal phases. Thus, by this arrangement the noise effect of the circuit is simultaneously greatly reduced, since the inner resistance reaches a minimum and the modulation is brought to its optimum value by the phase-like addition and subtraction, respectively, so that in this manner a very good noise-value-ratio is obtained.

It is significant that the inductance 19 does not require any retuning or adjustment, if the condensers are changed in the bridge, as long as the bridge circuit is frequency-determining for the oscillator; the circuit is arranged practically in this manner. This rests on the fact that it is the like condensers, which are responsible for the working frequency of the oscillator and for the resonance with the inductance 19, once set in series and another time set in parallel, whereby its ratio remains substantially constant by the bridge compensation.

The frequency for the oscillator can be chosen selectively, as long as it amounts to a multiple of the highest modulation frequency to be transmitted.

Referring now again to the drawings, and in particular to FIG. 2, it will be found that FIG. 2 shows a variation of the circuit disclosed in FIG. 1, in which instead of the condensers 14 and 15 of FIG. 1 disposed in series, a single condenser 20 is applied, which is disposed in the circuit between the rectifiers 12 and 13. The bridge output 8 is connected in this case with condenser 20, and in this manner only one load condenser is present. This circuit is even then of advantage, if the capacitive transformer, for instance a transmitter unit, is to be grounded and an asymmetrical output is desired.

Referring again to the drawings, and in particular to FIG. 3, a further variation of the circuits disclosed in FIGS. 1 and 2 is shown. If the second windings 10, 11 of the transformer 2 are to be deleted, the oscillator voltage required for the demodulator must be taken from the transformer 2 by means of the tops 21 and 22 of the secondary winding 3, 4. In this case, in each of the feeding conduits to the demodulator, an inductance 23 and 24 is added, the value of which must correspond to the previous inductance. All other elements bearing the same numerals as in FIGS. 1 and 2 are applied in the same manner and function in the same manner as in the circuit disclosed in FIGS. 1 and 2 and are for this reason not repeated here.

In the capacitive transformers in a bridge circuit it is required, to provide a particularly high frequency oscillator with very small amplitude-noise modulations, since during the slightest disturbance of the bridge compensation the oscillator noise is rectified in form of the amplitude noise modulation and appears at the output of the demodulator as disturbing, low-frequency noise. In order to reduce further the noise modulation, in accordance with a further feature of the present invention, in a capacitive transformer with transistors an oscillator voltage rectified by a directional conduit as a negative feed back voltage is provided at the base of the transistor of the oscillator.

By suitable choice of the diode, an appreciable lower noise modulation can be achieved. This is based on the principle that the high frequency is rectified and the thus obtained low frequency is applied to the base of the transistor as a negative feed back voltage.

One embodiment of this circuit is disclosed in FIG. 4, in which a high-frequency condenser microphone is shown in a bridge circuit with a transistor. The oscillator for producing the high-frequency voltage comprises a transistor 25, a primary winding of the transformer 2 with the winding terminals 26 and 27, and a negative feed back winding 28, 29. For the production of the negative feed back voltage the winding 26, 30 and the diode 31 are provided. At the terminals of the winding 26, 30 an alternating voltage is created, which is sufficiently positive at its peak amplitude, rendering the diode 31 conductive. The condenser 32 is, thereby, positively charged, which condenser 32 is designed in such manner that its impedance is small for the high frequency and large for the low frequency, in comparison with the base resistance 33 of the transistor 25. This arrangement brings about a reduction of the collector current of the transistor 25 and, thereby, a reduction of the oscillation amplitude. A balance position results, in which the diode 31 becomes conducting just at peak amplitude of the voltage. Due to the low frequency negative feed-back, the amplitude noise of the oscillator is strongly reduced. This oscillator is operated, for instance, with a frequency of 500 k.m.c.

The remaining elements shown in FIG. 4 are identical with those shown in FIGS. 1 and 2 and the same numerals have been applied therefor. The operation of this high frequency condenser microphone is exactly the same as the capacitive transformed more clearly shown in FIGS. 1 and 2, and described above and has the same advantages as the latter. The position of the inductance, in accordance with the present invention, is not limited to the described embodiments, and different circuit possibilities exist, as long as a provision is made that the inductance or inductances are disposed in series with the capacitance effective in the neutral branch of the bridge.

While I have disclosed several embodiments of the present invention, it is to be understood that these embodiments are given by example only and not in a limiting sense, the scope of the present invention being determined by the objects and the claims.

I claim:

1. A capacitive transformer in a bridge circuit comprising:
   (a) a transformer being provided with a primary and a secondary winding,
   (b) an oscillator operatively connected to said primary,
   (c) a bridge circuit including a neutral branch connected to said secondary winding,
   (d) a capacitance connected in said neutral branch,
   (e) an inductance disposed in series with said capacitance and forming an LC-member with said capacitance, the resonant frequency of said LC-member coinciding with the frequency of said oscillator for obtaining a zero output voltage in said neutral branch, and
   (f) a demodulation means connected to said neutral branch for demodulating a high frequency modulated signal in the secondary of said transformer.

2. A capacitive transformer in a bridge circuit comprising
   (a) a transformer being provided with a primary and a secondary winding said secondary winding having two taps,
   (b) an oscillator operatively connected to said primary,
   (c) a bridge circuit including a neutral branch connected to said secondary winding,
   (d) a capacitance connected in said neutral branch,
   (e) a demodulation means connected by two conduits to said two taps in the secondary of said transformer, and
   (f) an inductance disposed in each of the conduits connecting the taps to said demodulation means thereby directing the oscillator voltage from the secondary of the transformer to said demodulation means.

3. The capacitive transformer, as set forth in claim 2, wherein
   (a) said oscillator includes a transistor and a diode so that high frequency voltage demodulated by said diode is applied to the base of said transistor as a feedback voltage.

4. The capacitive transformer, as set forth in claim 3, wherein
   (a) said transformer is provided with an additional winding, said additional winding producing a feedback voltage.

5. The capacitive transformer, as set forth in claim 4, wherein
   (a) said transistor is provided with a collector, and the amplitude of the non-rectified feedback voltage is larger than the amplitude of the high-frequency voltage amplified to said collector of said transistor.

6. The capacitive transformer set forth in claim 5, wherein
   (a) said secondary winding is provided with a center tap,
   (b) said inductance is connected to said center tap of the transformer providing the oscillator voltage required for the demodulation means.
   (c) said secondary winding having two end terminals,
   (d) two rectifiers connected in one same direction in communication with said end terminals,
   (e) a plurality of discharge resistances and charging condensers connected to the secondary whereby one of said discharge resistances and charging condensers are connected in series with each of the two end end terminals and joined to the center tap of said secondary winding,
   (f) one of said plurality of discharge resistances being connected to the junction of said center tap and discharge resistance and charging condensers, and
   (g) said one of said plurality of discharge resistance being connected to bridge output.

7. The capacitive transformer as set forth in claim 5, wherein
   (a) said secondary winding being provided with a center tap,
   (b) said inductance being connected to said center tap providing the oscillator voltage required for the demodulation means,
   (c) said secondary winding being provided with two end terminals,
   (d) two rectifiers connected in one direction connected one each to the two end terminals of said secondary winding,
   (e) a discharge resistance connected between each of the two rectifiers and the center tap on the secondary of said transformer,
   (f) a charging condenser connected across the two end terminals of said secondary, and
   (g) one of said terminals as connected to the bridge output.

References Cited by the Examiner

UNITED STATES PATENTS

| | | | |
|---|---|---|---|
| 2,341,937 | 2/1944 | Maynard | 329—203 X |
| 2,851,592 | 9/1958 | Webster | 325—15 |
| 2,968,031 | 1/1961 | Higa | 340—265 |

OTHER REFERENCES

Self-Biasing Oscillator-Dorrell, I.B.M. Technical Disclosure Bulletin, vol. 3, No. 9, page 29, February 1961.

HERMAN KARL SAALBACH, *Primary Examiner.*

ROY LAKE, *Examiner.*

P. L. GENSLER, *Assistant Examiner.*